July 1, 1930.   M. P. VUCASSOVICH   1,769,087
FREEZING APPARATUS
Filed June 1, 1929
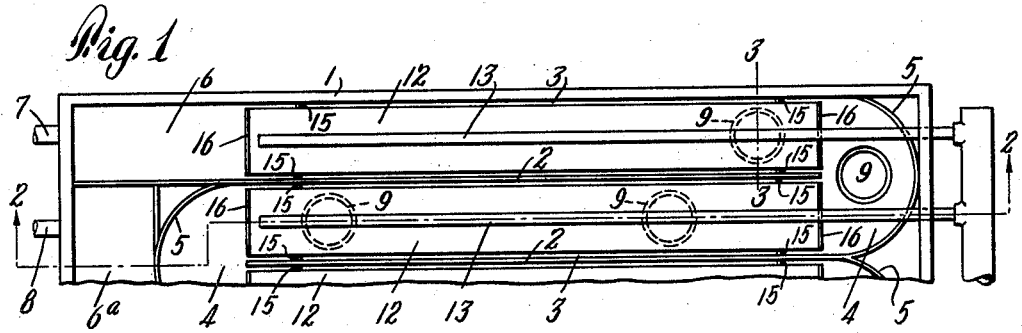
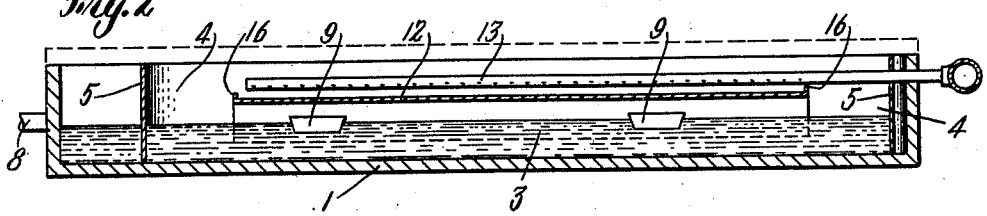
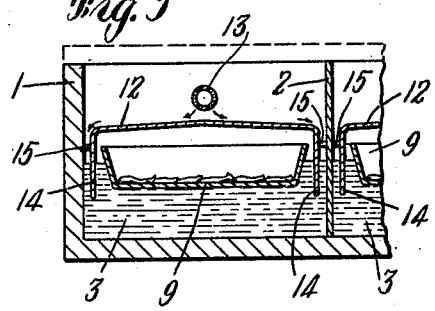 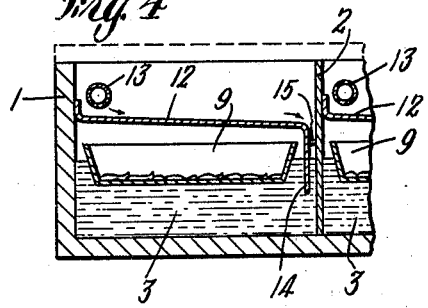
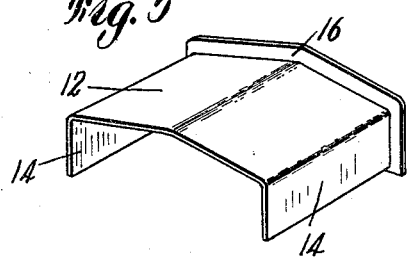
Inventor:
Michel P. Vucassovich.
by Wright Brown Quinby May
Attys.

Patented July 1, 1930

1,769,087

UNITED STATES PATENT OFFICE

MICHEL P. VUCASSOVICH, OF MAGNOLIA, MASSACHUSETTS

FREEZING APPARATUS

Application filed June 1, 1929. Serial No. 367,693.

This invention relates to apparatus for freezing fish and other comestibles, the apparatus being adapted to practice a method which consists in establishing a moving liquid having a freezing point below that of the material to be frozen, and with a movement from a loading point to a discharge point, said liquid having a temperature below the freezing point of the material, arranging said material in buoyant receptacles and subjecting the receptacles to movement through the flow of the liquid and to the temperature of the liquid as it is moved.

The apparatus to which the invention relates comprises a substantially horizontal container internally partitioned to form a sinuous runway which includes elongated major portions extending side by side, and shorter neck portions connecting the major portions in pairs, the runway being adapted to conduct a moving refrigerating liquid and buoyant receptacles floating thereon, in a sinuous path from a loading point to a discharge point, all as disclosed by Patent No. 1,641,441, dated September 6, 1927. In the operation of the apparatus disclosed by said patent, latent heat transference from material to be frozen in the floating receptacles is wholly downward through the bottoms and portions of the sides of the receptacles, to the liquid supporting the same, so that the freezing commences at the lower sides of the charges of material in the receptacles, and progresses upwardly.

It has been found that to ensure the freezing of the charges from their bottom to their top surfaces by said apparatus, a runway of such length is required as to render the apparatus undesirably bulky, and cause it to occupy an objectionably large area of floor space.

It has also been found that when the charges are more than usually thick, the time required for complete freezing is undesirably protracted, and that complete freezing is sometimes difficult of accomplishment.

The object of my invention is to enable an apparatus occupying a relatively small area to function effectively and without objectionable loss of time in completely freezing the charges.

The invention is embodied in an apparatus organized as above stated and characterized by means for causing an upward transference of latent heat from the top surfaces of the charges while the above-described downward transference is going on, so that the freezing progresses simultaneously from the bottom surfaces upward and from the top surfaces downward.

The accompanying drawings forming a part of this specification show portions of the apparatus disclosed by the above-mentioned patent, and means embodying my invention associated therewith.

Figure 1 is a fragmentary top plan view.

Figure 2 is a section on line 2—2 of Figure 1.

Figure 3 is an enlarged section on line 3—3 of Figure 1.

Figure 4 is a view similar to Figure 3, showing a modification.

Figure 5 is a fragmentary perspective view, showing an end portion of one of the deflectors shown by Figures 1, 2 and 3.

The same reference characters indicate the same parts in all of the figures.

In the drawings, 1 designates a substantially horizontal container or tank, having internal partitions 2 and 5 forming a sinuous runway composed of elongated major portions 3 located side by side, and shorter neck portions 4, connecting the major portions 3 in pairs.

The inlet end 6 of the runway is extended to the end of the container, to form a loading end, and the opposite end $6^a$ is extended to a point adjacent the loading end, to form a discharge end.

A liquid such as brine, having the temperature desired, is delivered through a pipe 7, and discharged through an overflow 8, maintaining a constant level through the apparatus. Buoyant receptacles 9 are provided, adapted to contain charges of material to be frozen, and to be moved by the liquid in the runway from the end 6 to the end $6^a$.

The apparatus thus far described and its operation, are fully described by the above-mentioned patent, latent heat being transferred downwardly from the charges to the liquid.

In carrying out my invention, I provide the described apparatus with means for causing an upward transference of latent heat from the top surfaces of the receptacle charges, so that freezing progresses from the top surfaces downward, as well as from the bottom surfaces upward. I have embodied said means in heat-conducting deflectors or roofs 12, preferably of thin sheet metal, located in the major portions of the runways above the path of the receptacles 9, said deflectors having upper surfaces which are slightly inclined laterally, and conduits 13, supported in any suitable way above the deflectors and perforated, or otherwise adapted to discharge a refrigerating liquid, such as brine, upon said surfaces, and thereby subjecting the receptacles and their charges to the temperature of the discharged liquid, said temperature being preferably the same as that of the moving liquid in the runway.

Each deflector is preferably formed as indicated by Figure 3, its central portion being slightly higher than its longitudinal edges, the conduit 13 being located over the central portion, so that the discharged liquid flows in opposite directions across oppositely inclined surfaces, as indicated by the arrows in Figure 3, and falls into the carrying liquid in the runway across downwardly projecting flanges 14, on the longitudinal edges of the deflector. The several deflectors may be attached as by bolts 15, to portions of the container, or they may be otherwise supported. Each deflector may be attached at one longitudinal edge to the container, as shown by Figure 4, and inclined downwardly from the attached edge to the opposite edge, the latter being provided with a flange 14. In this modification the conduit 13 is located over the highest portion of the deflector, and the discharged liquid flows in one direction across the deflector.

To simplify the construction, I proportion the deflectors so that they do not project over the neck portions 4 of the runway, and to prevent liquid from falling from the deflectors into the neck portions and receptacles therein, I provide the ends of the deflectors with laterally extending liquid guides 16.

I claim:

1. Freezing apparatus comprising a substantially horizontal container internally partitioned to form a sinuous runway, which includes elongated major portions extending side by side, and shorter neck portions connecting the major portions in pairs, the runway being adapted to conduct a moving refrigerating liquid and buoyant receptacles floating thereon, in a sinuous path extending from a loading to a discharging point, said apparatus being characterized by means cooled by flowing a refrigerating liquid thereover to cause an upward transference of latent heat from the top surfaces of the charges.

2. Freezing apparatus comprising a substantially horizontal container internally partitioned to form a sinuous runway, which includes elongated major portions extending side by side, and shorter neck portions connecting the major portions in pairs, the runway being adapted to conduct a moving refrigerating liquid and buoyant receptacles floating thereon, in a sinuous path extending from a loading to a discharging point, said apparatus being characterized by heat-conducting deflectors located in the major portions of the runways, above the path of the receptacles, and having slightly inclined upper surfaces, and conduits for discharging a refrigerating liquid upon said surfaces, and thereby subjecting the receptacles to the temperature of the discharged liquid.

3. Freezing apparatus as specified by claim 2, the deflectors having laterally extending liquid guides at their opposite ends, preventing the escape of liquid from said ends into the neck portions of the runway.

In testimony whereof I have affixed my signature.

MICHEL P. VUCASSOVICH.